(12) United States Patent
Ngo

(10) Patent No.: US 6,496,271 B1
(45) Date of Patent: Dec. 17, 2002

(54) WIRE AND SEAL PROFILE ANALYZER

(75) Inventor: Kiet Ngo, London (CA)

(73) Assignee: OES, Inc., London (CA)

(*) Notice: Subject to any disclaimer, the term of this patent is extended or adjusted under 35 U.S.C. 154(b) by 0 days.

(21) Appl. No.: 09/428,942

(22) Filed: Oct. 28, 1999

(51) Int. Cl.$^7$ ................................................ G01B 11/14
(52) U.S. Cl. ................... 356/613; 356/614; 250/559.36
(58) Field of Search ................................. 356/613, 601, 356/614, 621, 622, 634, 635, 638, 640, 394, 429–431; 382/141; 250/559.29, 559.36; 348/125, 86; 29/564.4, 707, 720

(56) References Cited

U.S. PATENT DOCUMENTS

| | | | |
|---|---|---|---|
| 3,947,129 A | * 3/1976 | Wiklund | |
| 4,395,119 A | * 7/1983 | Nakata et al. | 356/73 |
| 4,559,451 A | * 12/1985 | Curl | 250/560 |
| 4,649,621 A | * 3/1987 | Dusel et al. | 29/564.4 |
| 5,293,220 A | * 3/1994 | Fukuda et al. | 356/394 |
| 5,691,763 A | * 11/1997 | Ichikawa et al. | 348/86 |
| 5,841,675 A | 11/1998 | Ngo | |

FOREIGN PATENT DOCUMENTS

| | | | |
|---|---|---|---|
| JP | 59-216044 | * 12/1984 | |
| JP | 61-133844 | * 6/1986 | |

OTHER PUBLICATIONS

Product Brochure—OES Strip Sensor Model 71—Undated.
Product Brochure—OES Strip/Seal Sensor Model 95—Undated.
Product Brochure—OES Strip & Seal Sensor Model 97—Undated.

* cited by examiner

*Primary Examiner*—Hoa Q. Pham
(74) *Attorney, Agent, or Firm*—Carlson, Gaskey & Olds

(57) ABSTRACT

A wire analyzing device includes a source of radiation that irradiates a plurality of sensing elements. The source of radiation preferably is a laser beam and the sensing elements preferably are light sensitive devices that each provide an individual output indicating the amount of radiation incident on each sensing element. A wire sample is moved near the sensing elements so that it interrupts the radiation received by each sensing element. The output of each sensing element is utilized to determine any one or more of a number of desired characteristics of the wire sample. Example characteristics include the length and condition of an exposed, conductive portion of the wire, a position of an insulation shoulder, a position, orientation and condition of a seal member placed onto the wire.

27 Claims, 4 Drawing Sheets

WIRE AND SEAL PROFILE ANALYZER

BACKGROUND OF THE INVENTION

This invention generally relates to devices for inspecting the condition of wires and associated insulation and seals determine the quality or characteristics of each.

Wire strip inspection devices are well known and used in the industry in processing machines to monitor the quality of wires used in making electrical connections. The typical concern is to verify that the insulation on the wire has been properly removed. Conventional wire strip inspection devices include contact sensors where the exposed, conductive portion of the wire makes contact with two mechanical plates to form a connection that confirms that the insulation has been removed.

Other types of sensors have been utilized that do not require contact with the conductive portion of the wire. In conventional non-contact sensors, the wire is moved through a sensing window. The sensor head is mechanically positioned or aligned in the path of the insulation shoulder so that the insulation shoulder passes through the sensing window. Two sensing beams are typically utilized and positioned so that the insulation interrupts the first beam while the exposed conductive portion interrupts the second beam. A determination is made based upon a relative percentage between pulse width signals generated when the wire passes through the beams.

As an example, if the beam that is interrupted by the insulation is interrupted for ten milliseconds and the beam that is interrupted by the conductive portion is interrupted for six milliseconds, a relative percentage of 60% is determined. If the expected result should be 60%, then the wire strip is confirmed to be acceptable. Most systems have acceptable tolerance levels to accommodate slight variations.

Previously used sensing devices, however, are not without shortcomings and drawbacks. For example, mechanical setup is required to specifically accommodate any change in the expected strip length of the wire. Moreover, an operator typically is required to utilize trial and error to mechanically adjust the sensor over the travel position of the wire so that the individual beams are incident on the expected portion of the wire. Additionally, the wire-processing machine must be precisely calibrated to move each wire sample through the sensor at the exact same position or erroneous results are achieved.

Existing sensor arrangements do not provide sufficiently economical operation because of the large amount of operator input and sophistication that is required. Moreover, the large amount of precise and tedious adjustment required to accommodate different wire sizes, tolerances and seal applications introduces additional down time of a machine and the associated costs in loss of production time.

Additionally, previous devices are not capable of detecting all of the characteristics of a wire that ideally are monitored as part of the inspection process. For example, previously used sensors may be capable of detecting the presence of a seal on a wire but cannot determine the seal's orientation or condition.

Accordingly, there is a need for an improved wire inspection device that has greater capabilities, is more effective and does not require a large amount of operator input or adjustment. This invention provides such a system and avoids the shortcomings and drawbacks of the prior art discussed above.

SUMMARY OF THE INVENTION

This invention is a device for inspecting wires to determine selected characteristics of the wire such as an amount of insulation that has been removed, the condition of the exposed conductive portion of the wire, a location of the insulation shoulder relative to an end point on the conductive portion of the wire, a location of a seal member on the wire and an orientation and condition of the seal member. A device designed according to this invention is capable of determining any one or several of the wire characteristics, depending on the needs of a particular situation.

A device for determining selected characteristics of a wire that is designed according to this invention includes several components. A plurality of sensing elements are arranged in a desired orientation. Each of the sensing elements produces its own output. A source of radiation, which preferably is a laser beam, is positioned to irradiate the sensing elements. As a wire passes by the sensing elements and interrupts the radiation, each sensing element output indicates the amount of radiation that has been blocked by the wire passing each sensing element. A controller receives the outputs from the sensing elements and responsively determines the selected characteristics of the wire.

In one example, the sensing elements are aligned in a straight array and a masking element with a straight opening is placed near the sensing elements to enhance the resolution of the system. The opening in the masking element directs the radiation onto the sensing elements in a manner that facilitates more accurate analysis of a wire sample.

The various features and advantages of this invention will become apparent to those skilled in the art from the following detailed description of the currently preferred embodiment. The drawings that accompany the detailed description can be briefly described as follows:

DETAILED DESCRIPTION OF THE PREFERRED EMBODIMENT

Figure 1:
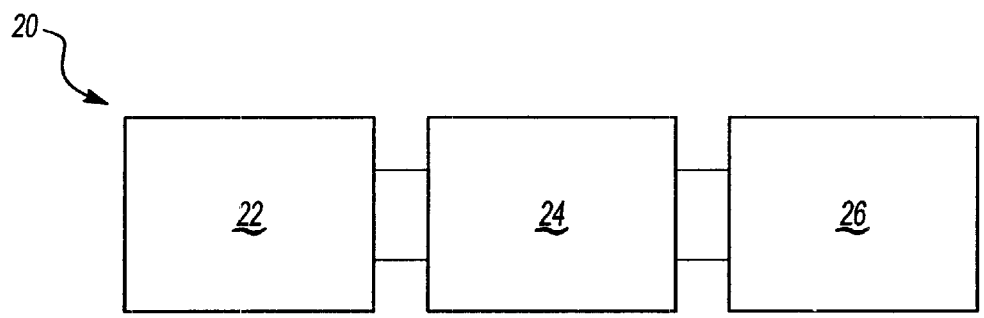
FIG. 1 schematically illustrates a machine designed according to this invention.

FIG. 1 schematically illustrates a wire-processing machine 20. A conventional wire-stripping module 22 removes a desired amount of insulation from an end of a conductive wire. A measuring module 24 determines the amount of insulation that was removed by the module 22 and other characteristics of the wire. Details of the preferred operation of the measuring module 24 are provided below. An assembly module 26 utilizes wires that have been approved by the measuring module 24 and connects the wires to respective terminals to complete an assembly operation. The assembly module 26 operates in a conventional manner.

Figure 2:
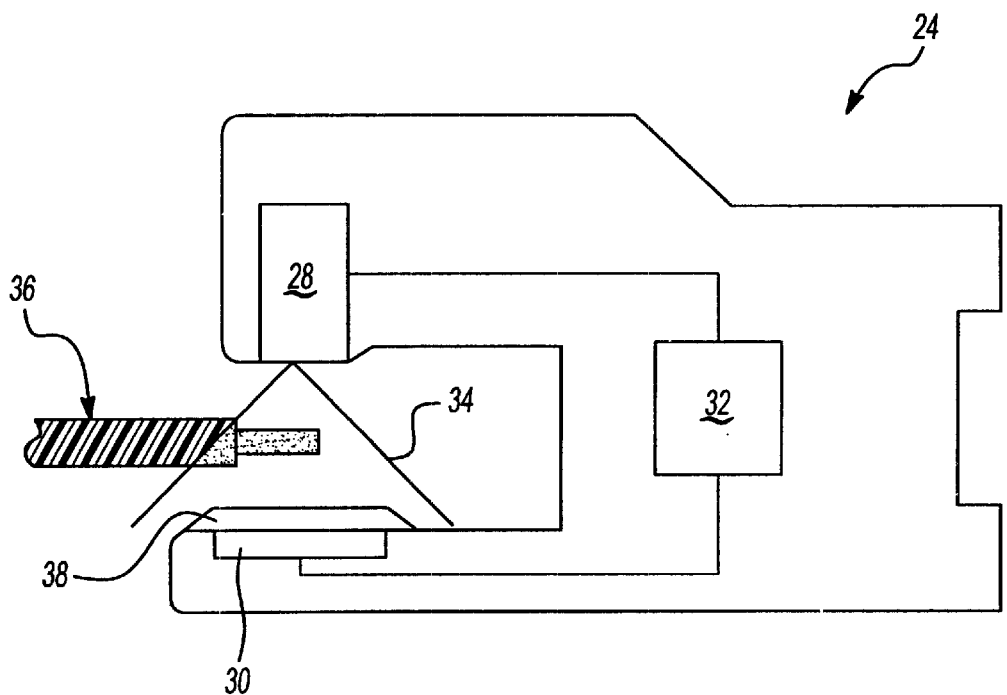
FIG. 2 schematically illustrates a sensing arrangement designed according to this invention.

FIG. 2 illustrates one example of a measuring module 24. A source of radiation 28 is utilized to irradiate a plurality of sensing elements 30. A controller 32 receives output signals from the sensing elements 30 and processes them, as will be described below, to determine the characteristics of a wire sample.

The preferred source of radiation 28 is a laser that generates a laser beam 34. A laser includes the advantage of being specifically aimed at the sensing elements 30. The plurality of sensing elements 30 preferably are light sensitive elements that each generate an individual output indicative of the amount of laser light incident upon the sensing element. As a wire sample 36 passes through the laser beam 34, the amount of radiation received by the sensing elements 30 is interrupted temporarily. The amount of interruption at each sensing element provides an indication of the conditions or characteristics of the various portions of the wire sample 36.

The preferred embodiment includes a masking element 38 that has an opening that corresponds to the arrangement of the sensing elements 30. The laser beam 34 passes through the opening in the masking element before being received or detected by the sensing elements 30. The masking element 38 provides greater resolution by focusing the radiation 34 from the laser 28 onto the sensing elements 30.

Figure 3:
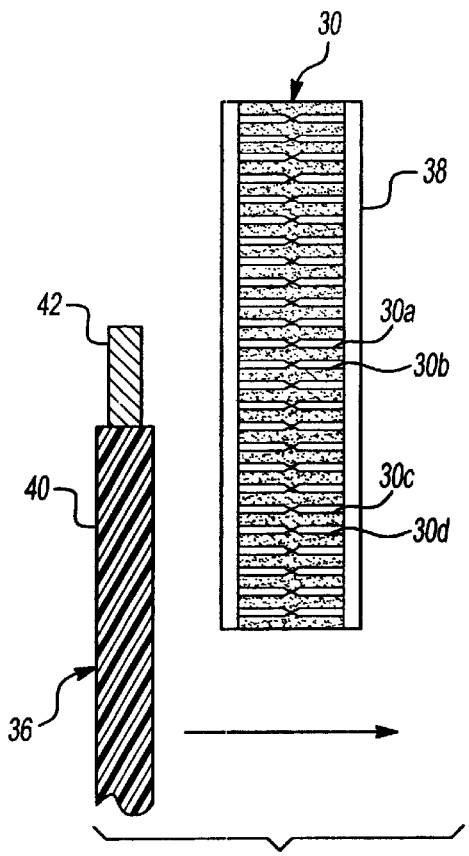
FIG. 3 diagrammatically illustrates selected portions of the embodiment of FIG. 2.

FIG. 3 schematically illustrates the wire sample 36 moving across the field of view of the sensing elements 30 through the laser beam 34. As the wire sample 36 interrupts the radiation incident onto the sensing elements 30, a different output will be provided by the different sensing elements, depending on the size of the portion of the wire sample that is aligned with each individual element.

For example, an insulation layer 40 on the wire sample 36 does not interrupt the radiation incident on the sensing elements 30a and 30b, but does interrupt the radiation incident on sensing elements 30c and 30d, for example. An exposed, conductive portion 42 on the wire does interrupt the radiation that is otherwise received by the sensing elements 30a and 30b. Since the width of the insulation 40 is greater than the width of the conductive portion 42, the amount of radiation interrupted at the sensors 30a and 30b will not be the same as the amount interrupted at the sensors 30c and 30d as the wire sample 36 passes by the array of sensing elements 30. This difference in the amount of interrupted radiation provides the controller 32 with some of the information needed to determine the desired characteristics of the wire sample 36. The output of each sensing element 30 provides information to the controller 32.

Figure 4:
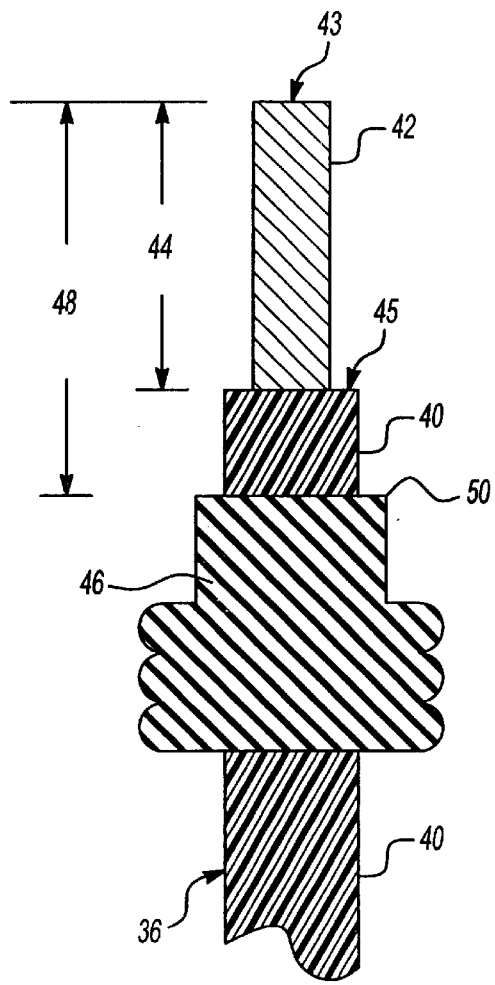
FIG. 4 schematically illustrates the results that are achievable using a system designed according to this invention.

Since a plurality of sensing elements 30 are utilized and each has its own output signal to the controller 32, a number of characteristics can be determined when desired. FIG. 4 schematically illustrates a profile of a wire sample 36 with insulation 40 and an exposed, conductive portion 42. The output of the individual sensing elements enables the device 24 to determine the information needed to establish the profile including the location of an end point 43 on the conductive portion 42. The location of the end point 43 is determined, for example, by monitoring which of the sensing elements 30 in the array is blocked by the conductive portion 42 while an adjacent sensing element is not blocked. The end point 43 can be estimated to be at the location of the sensing element that is blocked and is adjacent to one that is not.

The ability to locate the end of a wire sample is particularly advantageous since exact placement of the wire is not needed, when this invention is utilized. The device is capable of handling wires that are placed within the sensing window, regardless of the exact location of the end point on the wire. Previous devices were not capable of this since they relied on exact placement of the end of the wire. Therefore, a device designed according to this invention is capable of inspecting a greater number of wires with greater speed and accuracy than was previously possible.

The controller 32 preferably also determines a length 44 of the conductive portion 42, by determining the relative locations of the end point 43 and a shoulder 45 of the insulation 40. The shoulder 45 can be located in a similar manner as the strategy for locating the end point 43. Except that varying degrees of blocked radiation at adjacent sensing elements indicate the location of the shoulder 45.

The controller 32 not only determines the locations of the end point 43 and the shoulder 45, but also preferably determines the condition of the conductive portion 42 of the wire. As shown in FIGS. 5b, 5c, 5d and 5e, it is possible to have various qualities or conditions of the exposed conductive portion 42. For example, the conductive portions 42b and 42c have been damaged because a portion of the conductive wire has been broken off or removed, perhaps during the stripping process. The conductive portion 42d shows an example of wire splay. The conductive portion 42e has been bent into a non-straight orientation, which may not be acceptable under some circumstances. The individual outputs of the individual sensing elements 30 enables the controller 32 to determine when conditions such as those illustrated in FIGS. 5b through 5e are present.

For example, the individual outputs of the sensing elements 30 can be summed to generate information regarding the area of the conductor. The summed information then is compared to a known or determined reference value. The comparison then provides information indicative of conditions such as cut strands, wire splay and a short strip.

The device 24 also is capable of determining the location and conditions of a seal member 46 on the wire 36. The controller 32 preferably determines a distance 48 between the end point 43 and the front end 50 of the seal member 46. The controller 32 preferably also determines the orientation and condition of the seal member 46. The individual outputs of the individual sensing elements enables the controller 32 to determine the location, orientation and condition of the seal member 46.

Figure 5A:
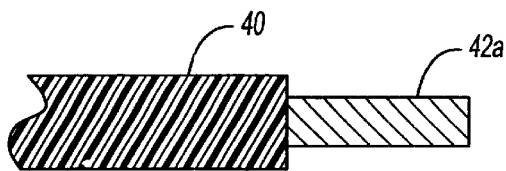
FIGS. 5a through 5h diagrammatically illustrate a plurality of wire samples, showing the different characteristics that can be determined using a device designed according to this invention.
Figure 5B:
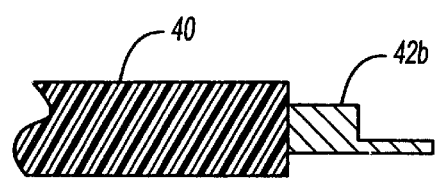
Figure 5C:
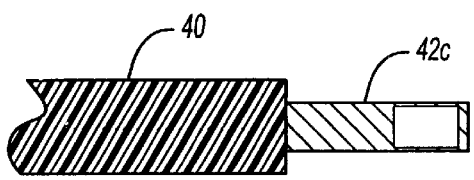
Figure 5D:
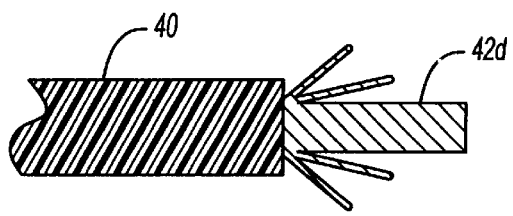
Figure 5E:
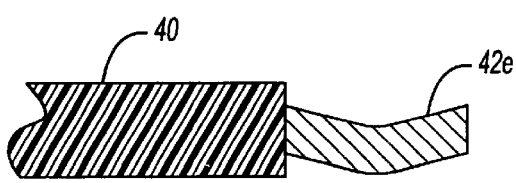
Figure 5F:
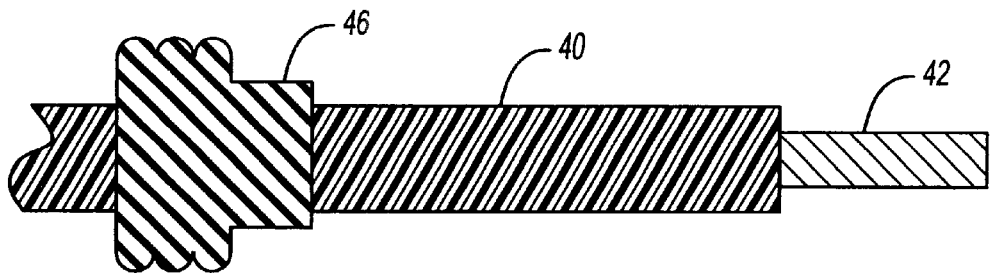
Figure 5G:
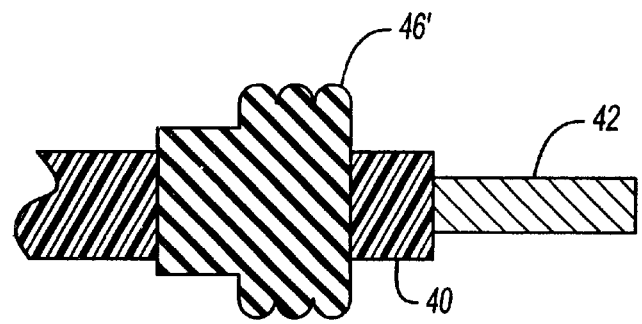
Figure 5H:
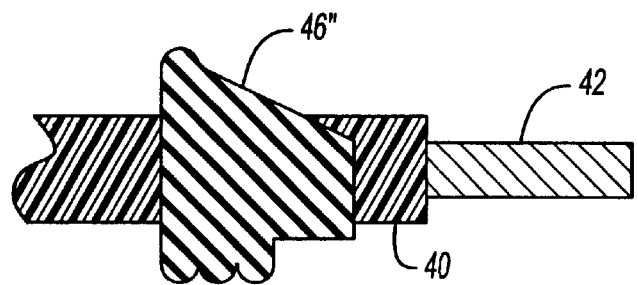

For example, the location of the seal member 46 may vary as shown in FIGS. 5f and 5g. Additionally, the orientation of the seal member may be reversed as can be seen by comparing the seal members 46 in FIG. 5f and the seal member 46' in FIG. 5g. Additionally, when a seal member has been damaged as illustrated in FIG. 5h, the controller 32 determines that the seal member 46" is not acceptable to accomplish a desired seal.

The individual sensing elements 30 provide enhanced capabilities that allow the device 24 to determine more characteristics of a wire sample compared with prior devices. Moreover, the specific adjustments and specific mechanical placements that were needed in prior devices are no longer concern when a device designed according to this invention is utilized. Therefore, higher speeds can be used in a wire assembly machine with greater manufacturing economies.

Given this description, those skilled in the art will be able to choose from among commercially available computers or microcontrollers to realize the controller 32 described in this specification. Alternatively, those having the benefit of this description will be able to design dedicated circuitry to perform the functions of the controller 32. Similarly, those who are skilled in the art have the benefit of this description will be able to program a computer or controller to determine the desired characteristics of a wire sample. A significant advantage is provided by this invention because a profile of the wire sample is effectively created, which indicates the multiple characteristics of the wire sample that may need to be monitored.

The device 24 preferably is taught the expected wire characteristics by placing the controller 32 into a learn mode utilizing a manual switch, for example. When the device 24 is placed into the learn mode, a known wire having the desired characteristics is passed through the inspection window. The controller 32 then determines, based upon the output of the sensing elements 30, the target conductor location, the target conductor diameter, the target conductor splay diameter and, when a seal is present, the target seal location. When other characteristics may be needed, the controller 32 is provided with information regarding those target dimensions or locations in the learn mode. Tolerances are applied to each of the target values and then the device 24 is prepared to inspect a plurality of wire samples.

The preceding description provides example implementations of this invention. Variations and modifications may become apparent to those skilled in the art that do not necessarily depart from the spirit or basis of this invention. The scope of legal protection given to this invention is not to be limited by the preceding description but can only be determined by studying the following claims:

The following is claimed:

1. A device for determining selected characteristics of a wire, comprising:
   a source of radiation;
   a plurality of sensing elements adjacent each other in a desired orientation such that radiation from the source is incident on each sensing element, each sensing element providing an output indicative of an amount of radiation incident on the sensing element and an amount of blocked radiation that is blocked by a wire that is moved between the sensing elements and the radiation source; and
   a controller that receives the outputs from the sensing elements and responsively determines a location of an end of the wire based upon an output from one of the sensing elements indicating no blocked radiation and an output from an adjacent one of the sensing elements indicating an amount of blocked radiation and selected characteristics of the wire.

2. The device of claim 1, wherein the source of radiation is a laser.

3. The device of claim 1, including a masking element having an opening corresponding to the orientation of the sensing elements and wherein the radiation passes through the masking element prior to being incident on the sensing elements.

4. The device of claim 1, wherein the wire is moved at a controlled speed past the sensing elements and the controller determines respective dimensions of portions of the wire from the received outputs of the sensing elements.

5. The device of claim 1, wherein the selected characteristics that the controller determines include a location of a shoulder of insulation on the wire relative to the end of the wire.

6. The device of claim 5, wherein the controller determines at least two characteristics of the wire between the shoulder of insulation and the end of the wire.

7. The device of claim 5, wherein the controller determines a location of a seal member on the wire relative to the end of the wire.

8. The device of claim 1, wherein the radiation source is a laser, the sensing elements are aligned in a straight line and the wire is continuously moved across the line of sensing elements at a selected speed and the controller determines a location of a shoulder of insulation on the wire relative to the end of the wire by using information from the sensing element outputs that are indicative of an amount of time that the wire blocks the radiation from each corresponding sending element, respectively.

9. The device of claim 1, including a mover that moves the wire between the sensing elements and the radiation source at a continuous speed.

10. A device for assembling electrical components that include at least one wire that is connected to at least one terminal, comprising:
    an insulation remover module that removes insulation from one end of the wire;
    a measuring module that measures an amount of the insulation that was removed by the remover module, the measuring module including:
    a source of radiation,
    a plurality of sensing elements positioned such that radiation from the source is incident on each sensing element, each sensing element providing an output indicative of an amount of radiation incident on the sensing element, and
    a controller that receives the outputs from the sensing elements and responsively determines the amount of insulation removed from the wire;
    a mover that moves the wire between the source of radiation and the sensing elements such that the sensing element outputs indicate an amount of radiation blocked by the wire from each sensing element and the measuring module determines whether a satisfactory amount of insulation has been removed; and
    an assembly module that connects the wire to the terminal when the measuring module indicates that a satisfactory amount of insulation has been removed.

11. The device of claim 10, wherein the measuring module determines at least two characteristics of the wire portion where the insulation has been removed based upon the outputs of the sensing elements, respectively.

12. The device of claim 10, wherein the source of radiation is a laser.

13. The device of claim 10, including a masking element having an opening and wherein the radiation passes through the masking element opening prior to being incident on the sensing elements.

14. The device of claim 10, wherein the wire is moved at a controlled speed past the sensing elements and the controller determines respective dimensions of portions of the wire from the received outputs of the sensing elements.

15. The device of claim 10, wherein the controller determines an end point on the wire and a location of a shoulder of insulation on the wire relative to the end point.

16. The device of claim 15, wherein the controller determines a location of a seal member on the wire relative to the end point.

17. The device of claim 10, wherein the radiation source is a laser, the sensing elements are aligned in a straight line and the wire is moved across the line of sensing elements at a selected speed and the controller determines an end point of the wire, a location of a shoulder of insulation on the wire relative to the end point by using information from the sensing element outputs that are indicative of an amount of time that the wire blocks the radiation from each sensing element, respectively.

18. The device of claim 10, wherein at least one of the sensing elements is positioned such that the incident radiation is not blocked by the wire or the insulation and an adjacent one of the sensing elements is positioned so that the corresponding incident radiation is blocked by an exposed end of the wire and wherein the controller determines a location of the end of the wire based upon the output of the at least one sensing element that is not blocked by the wire and the output of the adjacent one of the sensing elements that is blocked by the exposed end of the wire.

19. The device of claim 10, wherein the mover continuously moves the wire between the source of radiation and the sensing elements.

20. A method of determining selected characteristics of a wire having an exposed portion and an insulated portion, comprising the steps of:
   (A) arranging a plurality of sensing elements in a desire orientation;
   (B) irradiating the sensing elements;
   (C) moving the wire near the sensing elements such that the wire interferes with radiation incident on at least some of the sensing elements but does not interfere with the radiation incident on at least one of the sensing elements;
   (D) generating an output from each sensing element indicative of an amount of radiation incident on each element while step (C) is being performed; and
   (E) determining the location of an end of the wire, using the output from the element that is not blocked by the wire and the output of an adjacent sensing element that is blocked, and the characteristics of the wire from the outputs of step (D).

21. The method of claim 20, wherein step (E) includes determining a location of an insulation shoulder relative to the end of the wire.

22. The method of claim 21, wherein step (E) includes determining at least two characteristics of the wire portion between the end of the wire and the insulation shoulder.

23. The method of claim 20, wherein step (E) includes determining an area of the wire using a summation of the outputs of the sensing elements.

24. The method of claim 23, including determining a length of the conductive portion of the wire.

25. The method of claim 23, including determining whether the wire includes at least one of a cut strand or wire splay.

26. The method of claim 20, including generating target characteristic values by performing steps (C) through (E) using a preselected wire sample and using the determined characteristics of the preselected wire sample as the target characteristic values.

27. The method of claim 20, wherein step (C) includes continuously moving the wire at a selected speed.

* * * * *